United States Patent
Pförtner et al.

(10) Patent No.: US 11,120,625 B2
(45) Date of Patent: Sep. 14, 2021

(54) PRODUCING OVERALL CURVATURE CONTINUOUS SURFACES FROM SUBDIVISION SURFACE MESHES

(71) Applicant: Autodesk, Inc., San Rafael, CA (US)

(72) Inventors: Stephan Pförtner, Hannover (DE); Matthias Kurt Radeck, Hemmingen (DE)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 16/837,690

(22) Filed: Apr. 1, 2020

(65) Prior Publication Data

US 2020/0320785 A1 Oct. 8, 2020

Related U.S. Application Data

(60) Provisional application No. 62/828,127, filed on Apr. 2, 2019.

(51) Int. Cl.
*G06T 17/20* (2006.01)

(52) U.S. Cl.
CPC .................... *G06T 17/20* (2013.01)

(58) Field of Classification Search
CPC ....... G06T 17/20; G06T 17/205; G06T 19/20; G06T 17/30; G06T 2219/2021;
(Continued)

(56) References Cited

U.S. PATENT DOCUMENTS

| 2007/0030268 A1* | 2/2007 | Nigro | G06T 17/20 345/420 |
| 2008/0225043 A1* | 9/2008 | Rosel | G06T 17/30 345/420 |

(Continued)

OTHER PUBLICATIONS

Cashman et al., "NURBS with extraordinary points: high-degree, non-uniform, rational subdivision schemes", https://dl.acm.org/doi/10.1145/1576246.1531352, Jul. 2009 (Year: 2009).*

(Continued)

*Primary Examiner* — Xilin Guo
(74) *Attorney, Agent, or Firm* — Fish & Richardson P.C.

(57) ABSTRACT

Methods, systems, and apparatus, including medium-encoded computer program products, for computer aided design of structures include, in one aspect, a method for producing continuous ($G^2$) NURBS surfaces from arbitrary subdivision surface meshes, the method including: obtaining a control mesh of a subdivision surface; obtaining limit surface patches subdivided from the control mesh using at least two levels around any extraordinary regions of the control mesh; discarding discontinuous surface patches, which include a star point; producing replacement surface patches for the discarded patches using adjacent surface patches, wherein the replacement surface patches are curvature continuous with each other and with the adjacent surface patches; combining each of the replacement surface patches with at least one non-discarded surface patch generated from a same polygon of the control mesh as the replacement surface patch; and processing the combined surface patches for output by a physical device.

20 Claims, 7 Drawing Sheets

(58) Field of Classification Search
CPC ....... G06T 17/00; G06T 15/205; G06F 30/20; G06F 2119/18; G06F 30/12
See application file for complete search history.

(56) References Cited

U.S. PATENT DOCUMENTS

2016/0224693 A1* 8/2016 Maisonneuve ......... G06T 17/20
2020/0320228 A1 10/2020 Lupas

OTHER PUBLICATIONS

Lupas et al., "U.S. Appl. No. 62/828,186, Hybrid Surface Modelling with Subdivision Surfaces and NURBS Surfaces," filed on Apr. 2, 2019, 40 pages.

Ismail, "Introduction into NURBS," (Aug. 1, 2015) [online] (retrieved from https://www.ebalstudios.com/blog/introduction-nurbs), 26 pages.

Schäfer et al., "Dynamic Feature-adaptive Subdivision," In Proceedings of the 19th Symposium on Interactive 3D Graphics and Games (i3D '15). ACM, New York, NY, USA, 31-38. https://doi.org/10.1145/2699276.2699282.

Unknown author, Subdivision Surface Modeling, Autodesk® Maya® 2011 Software, © 2010 Autodesk, Inc., 68 pages.

Unknown author, "DEVELOP3D—Review: Autodesk Alias 2020," (Jan. 8, 2020) [online] (retrieved from https://develop3d.com/reviews/review-autodesk-alias-2020-automotive-industrial-desi), 6 pages.

Unknown author, "Non-uniform Rational B-spline—Wikipedia," (Mar. 21, 2019) [online] (retrieved from https://en.wikipedia.org/wiki/Non-uniform_rational_B-spline), 12 pages.

Unknown author, "Power SubD-NURBS for 3ds Max®," (Mar. 25, 2019) [online] (retrieved from https://www.ebalstudios.com/blog/introduction-nurbs), 3 pages.

Unknown author, "Subdivision surface—Wikipedia," (Mar. 21, 2019) [online] (retrieved from https://en.wikipedia.org/wiki/Subdivision_surface). 5 pages.

Unknown author, "Subdivision Surfaces," (Mar. 27, 2019) [online] (retrieved from http://graphics.pixar.com/opensubdiv/docs/subdivision_surfaces.html), 5 pages.

Unknown author, "T-spline—Wikipedia," (Mar. 21, 2019) [online] (retrieved from https://en.wikipedia.org/wiki/T-spline), 2 pages.

Yong et al., "Adaptive Subdivision of Catmull-Clark Subdivision Surfaces," Computer-Aided Design & Application, 2005, 2(1-4):253-261.

* cited by examiner

PRODUCING OVERALL CURVATURE CONTINUOUS SURFACES FROM SUBDIVISION SURFACE MESHES

CROSS-REFERENCE TO RELATED APPLICATIONS

This application claims the benefit under 35 U.S.C. § 119(e) of U.S. Patent Application No. 62/828,127, entitled "PRODUCING OVERALL CURVATURE CONTINUOUS SURFACES FROM SUBDIVISION SURFACE MESHES", filed Apr. 2, 2019, which is hereby incorporated by reference.

BACKGROUND

This specification relates to surface modelling in computer graphics applications, such as computer generated animation and computer aided design of physical structures to be manufactured using additive manufacturing, subtractive manufacturing and/or other manufacturing systems and techniques.

In three dimensional (3D) computer graphics applications, a Subdivision Surface is a geometric representation of a smooth surface in which the smooth surface is defined by a piecewise linear polygon mesh. The smooth surface is calculated from the polygon mesh using a predefined refinement scheme that determines the limit of recursive subdivision of each polygon face into smaller faces that better approximate the smooth surface. In some Subdivision Surface applications, the limit surface is calculated directly using known techniques, rather than through recursive procedure calls. Subdivision Surfaces are often used for the creation and final rendering of character shapes in computer animation. For example, Pixar provides open source Subdivision Surface code called OpenSubdiv for Subdivision Surface computation.

Non-Uniform Rational Basis Spline (NURBS) is another smooth surface modelling representation used in 3D computer graphics applications. A NURBS surface is a geometric representation of a smooth surface where the NURBS surface is described by its degree, weighted control vertices and knot vector. NURBS surfaces are a generalization of Bézier surfaces, are commonly used in Computer Aided Design (CAD) and Computer Aided Industrial Design (CAID) programs as the primary representation of surfaces, and are part of various industry wide standards. In addition, NURBS surfaces can be the limit surfaces output from a Subdivision Surface computation, with the restriction that these NURBS surfaces are not an exact representation of the limit surface in extraordinary regions.

SUMMARY

This specification relates to surface modelling in computer graphics applications, such as computer generated animation and computer aided design of physical structures to be manufactured using additive manufacturing, subtractive manufacturing and/or other manufacturing systems and techniques, in which curvature continuous ($G^2$) surfaces are produced from arbitrary subdivision surface meshes. Particular embodiments of the subject matter described in this specification can be implemented to realize one or more of the following advantages. NURBS surfaces can be produced as the limit surface for a subdivision surface model of a complex 3D surface, but rather than only generating approximations of the limit surface in extraordinary regions, the produced NURBS surfaces can be guaranteed to have curvature continuity ($G^2$ continuity) across all regions of the limit surface. Thus, a complex surface can be created using a subdivision surface technique, but the produced limit surface can have high enough quality (i.e., Class A, "technical" surfaces) to be used in certain industrial design and manufacturing contexts (e.g., for the automotive industry). For modelling organic shapes in a user interface, subdivision surfaces can be much quicker for the user as compared with modeling NURBS surfaces directly through the user interface.

Moreover, the number of resulting NURBS surfaces, which represent the limit surface of the subdivision surface technique, can be kept small in relation to tradition subdivision surface modeling processes. This facilitates user editing of the NURBS surfaces using traditional NURBS modeling tools. The output can be general purpose NURBS surfaces that are of high enough quality to be used in NURBS modeling workflows, and the output can have fewer total surfaces to facilitate the use of NURBS modeling workflows. Note that, for Class A 3D models, curvature continuous ($G^2$) surfaces are needed to prevent seeing seams between the patches, e.g., when a rendering is created that shows highlights running through the full shape of the 3D model (e.g., a model of a car or other object) being designed, as the tools in Class A modelling really measure the surface and can end up exaggerating the problem areas of traditional limit surfaces of a subdivision surface mesh.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
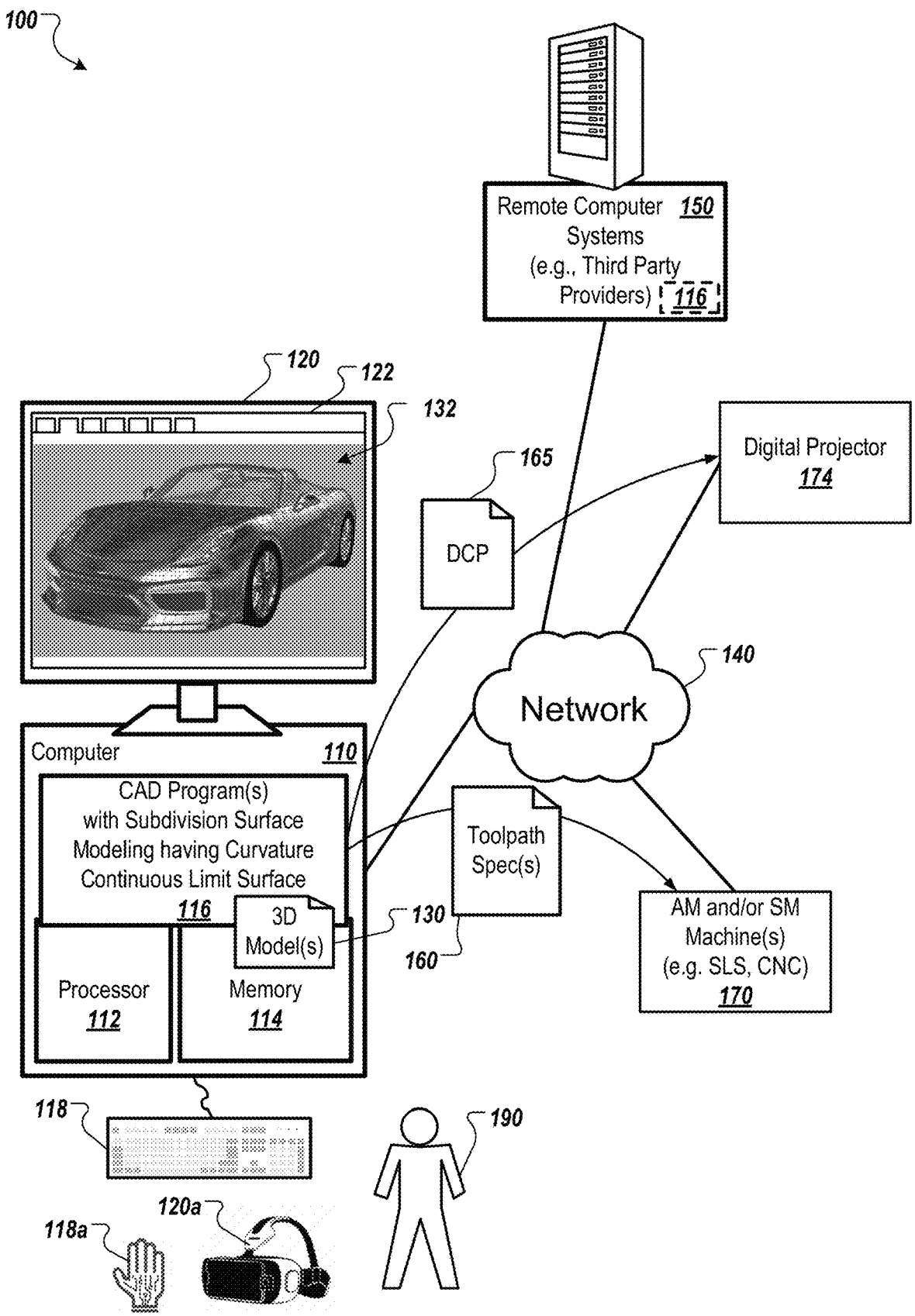
FIG. 1 shows an example of a system usable to design and manufacture physical structures and/or generate computer animation using subdivision surface modeling having curvature continuous limit surfaces.

FIG. 1 shows an example of a system 100 usable to design and manufacture physical structures and/or generate computer animation using subdivision surface modeling having curvature continuous limit surfaces. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions, including a subdivision surface modeling technique that produces a curvature continuous limit surface across the entirety of a complex surface, including across star points.

As used herein, CAD refers to any suitable program used to design physical structures that meet specified design requirements, regardless of whether or not the program is capable of interfacing with and/or controlling specific manufacturing equipment. Thus, CAD program(s) 116 can include Computer Aided Industrial Design (CAID) program(s), Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that a program 116 operating locally at computer 110 can offload processing operations (e.g., subdivision surface and/or NURBS processing) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 118a and/or a VR/AR headset 120a.

As noted above, the CAD program(s) 116 implement 3D modeling functions, which means a 3D model 132 can be built using the CAD program(s) 116. The CAD program(s) 116 can implement physical simulation (locally and/or by remote procedure call) to assist in building the 3D model 132. Physical simulations, such as FEA, Computational Fluid Dynamics (CFD), Acoustics/Noise Control, thermal conduction, and/or computational injection molding simulations are often integral components in CAD-based product development. The CAD program(s) 116 can be used to build precise geometric descriptions of the design model, while physical simulations enable improved performance without time consuming physical testing.

The CAD program(s) 116 can provide user interface elements that enable the user to specify inputs for physical simulation(s), such as materials and loading cases for the 3D model(s) 132, where the loading cases define loads in different directions to be borne by a part being designed during use of the part. Thus, a user 190 can interact with the UI 122 of the CAD program(s) 116, including producing a full mechanical problem definition for a part to be manufactured, so as to build and modify 3D model(s) 132, which can be stored in 3D model document(s) 130. In the example of FIG. 1, the 3D model 132 is of a specific car design, but this is merely one of many possible 3D models that can be designed using the systems and techniques described herein.

In the example shown, the 3D model 132 rendered to the display device 120 in the UI 122 shows both the subdivision surface control mesh and NURBS surfaces generated therefrom. As described in further detail below, the limit surface of the subdivision surface for the 3D model 132 is generated such that the limit surface is curvature continuous, including in extraordinary regions of the surface. As used herein, an "extraordinary region" refers to a portion of a subdivision surface control mesh that includes an extraordinary point or an N-gon, and "extraordinary region" is also used to refer to a portion of the limit surface for the subdivision surface that includes a star point resulting from the extraordinary point or N-gon in the control mesh (as well as potentially surface discontinuities resulting from crease ends). An extraordinary point is (1) a vertex on the control mesh where N control polygons meet, in the mesh interior, and N is not equal to four, and also (2) a vertex on the control mesh where N control polygons meet, at the mesh boundary, and N is greater than two. A star point is (1) a point on the limit surface where N surface patches meet, in the surface interior, and N is not equal to four, and also (2) a point on the limit surface where N surface patches meet, at the surface boundary, and N is greater than two. Further, an "N-gon" refers to a control polygon of the subdivisions surface control mesh with N vertices with N not being equal to four. Both extraordinary points and N-gons in the control mesh lead to star points on the limit surface.

Figures 2A, 2B, 2C:
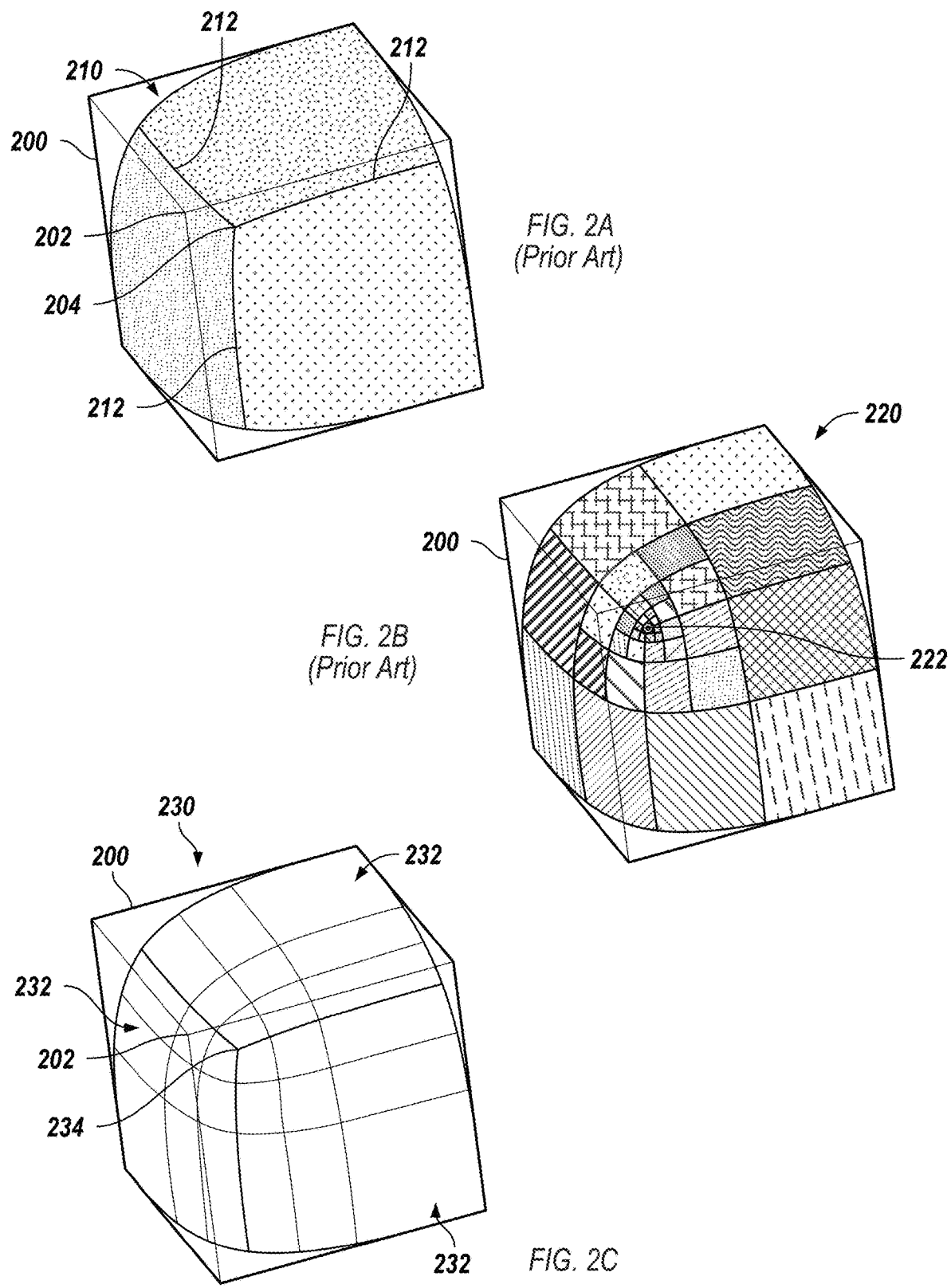
FIGS. 2A-2C are graphical renderings showing differences between different techniques for producing a limit surface of a subdivision surface.

FIGS. 2A-2C are graphical renderings showing differences between different techniques for producing a limit surface of a subdivision surface. FIG. 2A shows a limit surface 210 generated from a control mesh 200 having an extraordinary point 202, which has a corresponding star point 204 on the limit surface 210. In this example, no curvature continuity is created, and so the transitions 212 at the borders between the three surface patches shown are neither tangential continuous nor curvature continuous. In this example, the angle between the discontinuous surfaces is ~1.5 degrees.

FIG. 2B shows a limit surface 220 generated from the same control mesh 200 (with the same extraordinary point 202) using an adaptive subdivision surface method. Note that the adaptive refinement of the subdivision surface method downsizes the problematic area to create curvature continuity along a majority of the borders between surface patches. In the example shown, the adaptive subdivision for the extraordinary point goes down to level 5, creating 48 patches. This creation of multiple, small surface patches around the star point on the limit surface is unhandy in surfacing applications, e.g., it significantly increases the time and effort needed to make direct modifications to the limit surface (e.g., using traditional NURBS modeling tools) in the region around the star point. Moreover, the discontinuity is not fully removed. Thus, a small region 222 around the star point is not curvature continuous. In this example, the angle between the discontinuous surfaces is reduced to ~0.1 degree.

FIG. 2C shows a limit surface 230 generated from the same control mesh 200 (with the same extraordinary point 202) using the systems and techniques described in this application. As shown in this example, three NURBS surfaces 232 are produced, one for each quad face of the control mesh, and the three NURBS surfaces 232 are overall curvature continuous, including at a star point 234 corresponding to the extraordinary point 202 on the control mesh. Thus, not only is the angle between the three surface patches 232 exactly 0 degrees, but the curvature is also the same at the transition.

Returning to FIG. 1, in some implementations, the user 190 is enabled by the CAD program(s) 116 to both create and edit subdivision surface control meshes, and also edit the surfaces produced automatically by the CAD program(s) 116 from each subdivision surface control mesh. For example, the CAD program(s) 116 can integrate one or more subdivision surface modeling techniques with one or more NURBS modelling techniques to make it easier and more intuitive for the user 190 to create new 3D models, as described in U.S. Pat. application Ser. No. 16/837,618, "HYBRID SURFACE MODELLING WITH SUBDIVISION SURFACES AND NURBS SURFACES", filed on Apr. 1, 2020, and published on Oct. 8, 2020 as U.S. Pub. No. 2020-0320228, and as described in U.S. Provisional Patent Application No. 62/828,186, "HYBRID SURFACE MODELLING WITH SUBDIVISION SURFACES AND NURBS SURFACES", filed Apr. 2, 2019, which are both hereby incorporated by reference. This can facilitate the rapid production of high quality (Class A) surfaces, eliminating discontinuities and dense control vertices (CV) distribution around star points in the 3D model. Note that many technical surfacing applications, such as automobile design, require high quality Class A surfaces, where the complex surface generated for display or manufacturing is curvature continuous ($G^2$ continuity) across all regions of the complex surface.

In addition, in some implementations, the CAD program(s) 116 implement manufacturing control functions. Once the user 190 is satisfied with a 3D model 132, the 3D model 132 can be stored as the 3D model document(s) 130 and/or used to generate another representation of the model (e.g., an .STL file for additive manufacturing). This can be done upon request by the user 190, or in light of the user's request for another action, such as sending the 3D model 132 to additive manufacturing (AM) machine(s) and/or subtractive manufacturing (SM) machine(s) 170, or other manufacturing machinery, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the CAD program(s) 116 can provide a document 160 (having toolpath specifications of an appropriate format) to an AM and/or SM machine 170 to produce a physical structure corresponding to at least a portion of the 3D model 132. An AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modelling (FDM), which can include metals deposition AM). In some cases, the AM machine 170 builds the physical structure directly, and in some cases, the AM machine 170 builds a mold for use in casting or forging the physical structure. In addition, the user 190 can save or transmit the 3D model 132 for later use. For example, the CAD program(s) 116 can store the document(s) 130 that includes the 3D model 132.

An SM machine 170 can be a Computer Numerical Control (CNC) milling machine, such as a multi-axis, multi-tool milling machine used in the manufacturing process. For example, the CAD program(s) 116 can generate CNC instructions for a machine tool system 170 that includes multiple tools (e.g., solid carbide round tools of different sizes and shapes, and insert tools of different sizes that receive metal inserts to create different cutting surfaces) useable for various machining operations. Thus, in some implementations, the CAD program(s) 116 can provide a corresponding document 160 (having toolpath specifications of an appropriate format, e.g., a CNC numerical control (NC) program) to the SM machine 170 for use in manufacturing the physical structure using various cutting tools, etc.

In some implementations, the CAD program(s) 116 provide instructions to build a workpiece in a first stage of manufacturing, e.g., using direct AM and/or using forging and/or casting methods, and the CAD program(s) 116 also provide instructions to machine the workpiece, e.g., roughing and/or finishing operations, in a second stage of manufacturing, e.g., in a 3-axis CNC milling system, in order to form the completed structure. In general, various different manufacturing systems and techniques can be employed, either alone or in combination, to produce a final structure, and the CAD program(s) 116 can include suitable algorithms to generate toolpath specifications 160 for one or more of these various systems to manufacture a part that has been designed using the systems and techniques described in this application.

In addition, in some implementation, no physical manufacturing is involved. The systems and techniques described herein are applicable to any suitable surface modelling software. Thus, in some implementations, the CAD program(s) 116 can be animation production programs that render the 3D model 132 to a document 165 of an appropriate format for visual display, such as by a digital projector 174 (e.g., a digital cinema package (DCP) 165 for movie distribution) or other high resolution display device. Other applications are also possible.

Figure 4:
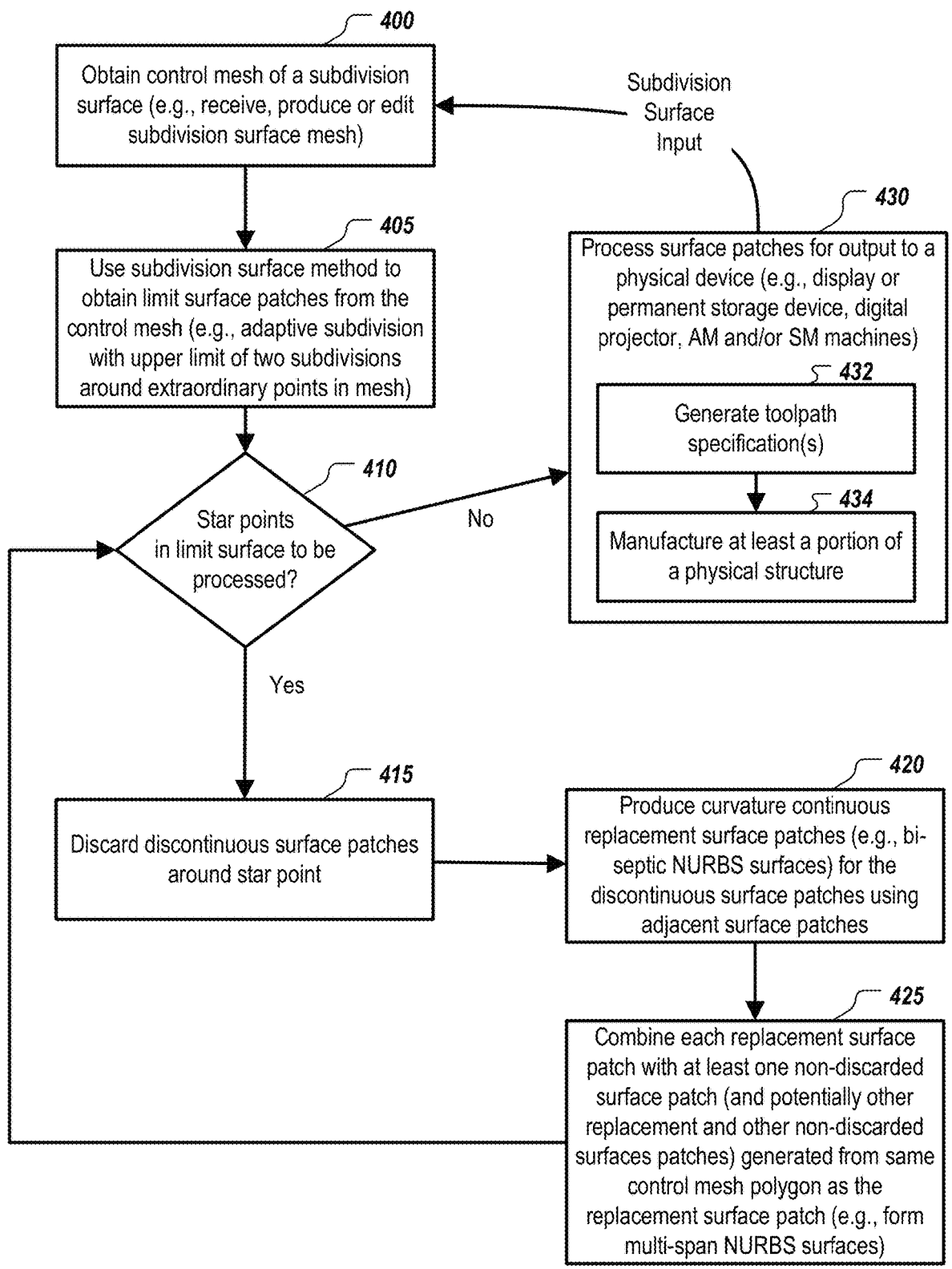
FIG. 4 shows an example of a process to produce a curvature continuous limit surface for a subdivision surface in a 3D model.

FIG. 4 shows an example of a process, e.g., performed by CAD program(s) 116, to produce a curvature continuous limit surface for a subdivision surface in a 3D model. A control mesh for a subdivision surface is obtained 400. This can involve receiving the control mesh from another process, or producing and/or editing the control mesh based on user input, e.g., input received from user 190 through input device(s) 118.

A subdivision surface method is used 405 to obtain surface patches from the control mesh. The multiple surface patches represent a limit surface of the subdivision surface, and the subdivision surface method subdivides the control mesh at least twice in at least one extraordinary region of the control mesh (an extraordinary point or an N-gon). For example, the subdivision surface can be an adaptive subdivision surface program, e.g., an open source subdivision surface program, such as OpenSubdiv, available from Pixar, and obtaining 405 the surface patches can involve calling the adaptive subdivision surface program with an upper limit of two subdivisions.

Figure 3A:
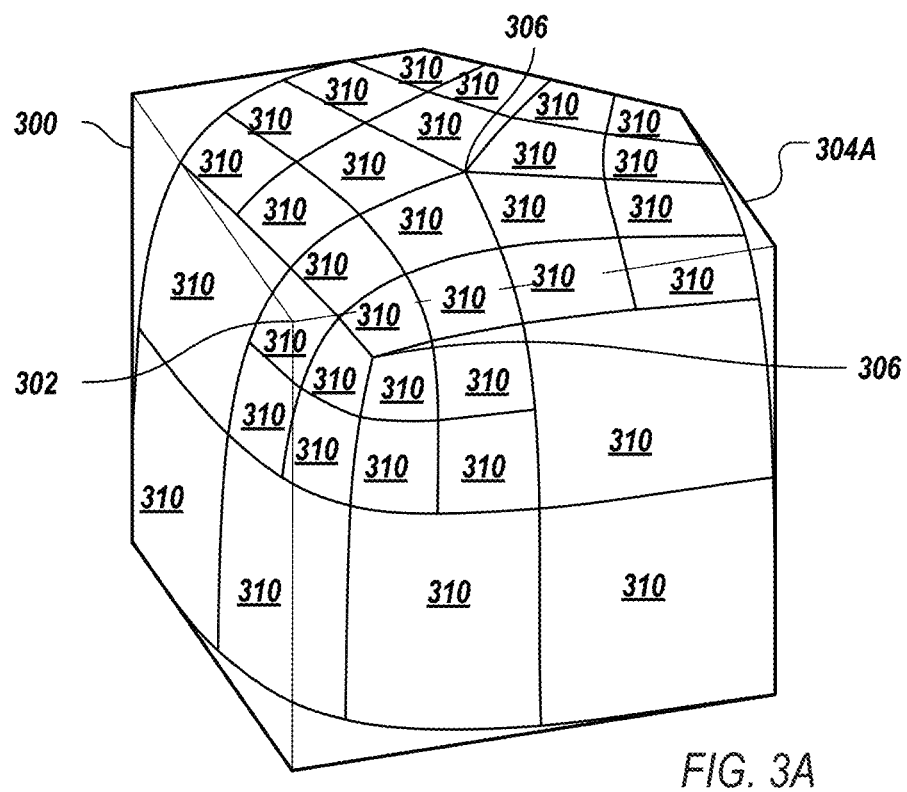
FIGS. 3A-3D are graphical renderings showing an example of producing a curvature continuous limit surface of a subdivision surface.

The surface patches produced by the adaptive subdivision surface program can be bi-cubic Bézier patches or other types of surface patches. FIG. 3A is graphical rendering showing an example of a control mesh 300, which includes both an extraordinary point 302 and an N-gon 304A. A level two adaptive subdivision surface method has been applied to the control mesh 300, resulting in two star points 306. As shown, the adaptive refinement subdivided by two levels produces bi-cubic Bézier patches 310 as the limit surface for the control mesh 300.

Returning to FIG. 4, the surface patches representing the limit surface of the subdivision surface are then checked 410 for any star points. While star points remain, the surface patches around each star point are processed to remove discontinuity at the star point. The discontinuous surface patches around the star point are discarded 415. Each discontinuous surface patch is a surface patch (e.g., a bi-cubic Bézier patch) that includes the star point, i.e., one of the patch's corners is the star point. Note that, because of the two levels of subdivision around each star point, each discontinuous surface patch will only have one corner that is a star point.

Figure 3B:
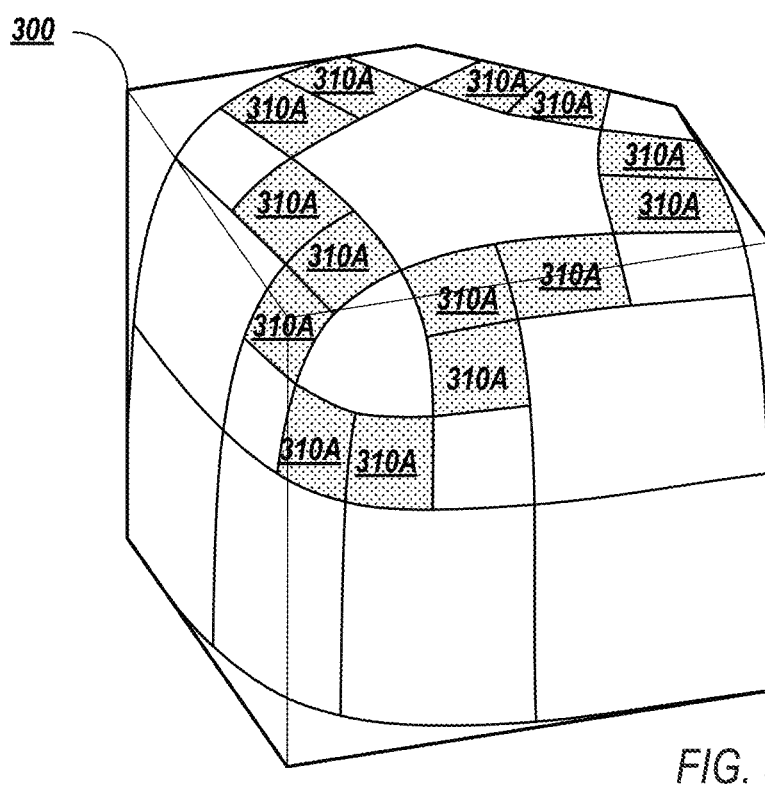

FIG. 3B is graphical rendering showing the example of FIG. 3A, after the discontinuous surface patches have been discarded. Note that the level-2 adaptive refinement serves the purpose that the holes left in the limit surface after the discarding are always surrounded by continuous patches 310A of the same "size" (i.e., the same subdivision level). Without this, independent calculation of replacement surface patches would likely not be possible, as any change to one replacement surface patch would affect the calculation of the bordering replacement surface patch, and vice versa. Note that adaptive refinement need not be used, but is useful in that some portions of the control mesh often need no subdivision or only one level of subdivision. In addition, as used herein, the continuous patches 310A are referred to as "adjacent surface patches" because they are adjacent to the surface patches that have been discarded.

Returning again to FIG. 4, replacement surface patches are produced 420 for the discontinuous surface patches using adjacent surface patches from the multiple surface patches, where the replacement surface patches are curvature continuous with each other and with the adjacent surface patches (each replacement patch has $G^2$ continuity with its adjacent patches and $G^2$ continuity with its adjacent replacement patches around the same star point in the limit surface). The computed patches are affine dependent on the surrounding patches only. Each of the replacement surface patches can be a surface patch of degree seven, e.g., a bi-septic NURBS surface, in order to achieve curvature continuous transitions. Using higher degree surfaces provides more control over the surface: a degree 3 surface has 4×4 control vertices (16 total control points), and a degree 7 surface has 8×8 (64) control vertices. This provides more freedom to adapt the boundary to the neighbors by giving the program more flexibility (more control points to tweak) in producing the replacement surface patches for the limit surface.

In some implementations, higher degree surfaces (e.g., degree 8, degree 9, or degree 10) are used. More control points creates more degrees of freedom to align the patches with neighbors with $G^2$ continuity, thus providing good reflection lines along a complex surface when rendered to an output device. The control vertices of the patches can be placed in order to fulfill curvature continuity, and with respect to smoothness and even distribution. As a result, the shape of the patches is not wavy but smooth, although having a high formal degree. In many implementations, degree 7 surfaces are sufficient. In general, some control points are needed to create continuity to an adjacent patch, and to create a surface patch that is curvature continuous, at least three rows of control points are needed on each boundary. So to align a NURBS patch on both its left and its right sides to be curvature continuous with a neighbor, at least 3 rows of control vertices are needed on the left and at least 3 rows of control vertices are needed on the right. In some cases, one or more rows of control vertices can be shared. In some implementations, eight rows of control vertices are used to help with alignment when generating the replacement surface patches.

Each of the replacement surface patches is checked to see if it can be combined 425 with one or more non-discarded surface patches (as well as one or more other replacement surface patches) generated from a same polygon of the control mesh as the replacement surface patch. For example, the combining 425 can include forming multi-span NURBS surfaces from the replacement surface patches and non-discarded surface patches of the multiple surface patches representing the subdivision limit surface. Having fewer surfaces representing the limit surface of the subdivision surface is preferable when further modifications are to be made to the limit surface separate from the control mesh, e.g., using traditional NURBS modeling tools on the limit surface, e.g., a trim tool used on the limit surface. An unnecessarily high number of patches can complicate further processing for both designers (users) that work on the 3D model and algorithms that process the 3D model. Thus, the system and techniques described here can reduce the number of finally produced patches to a minimum while also guaranteeing curvature continuity everywhere on a complex surface, including around extraordinary points and N-gons in the control mesh for the subdivision surface.

Identifying which patches originate from the same polygon of the control mesh for the combining 425 can be done based on output from the subdivision surface method, which can specify which patches originated from which control polygon, and the association between the replacement patches and the discarded patches is known. One or more data structures can be used as well to assist in the processing, e.g., to support performant adjacency and neighborhood search (e.g., which of the other patches is 'north'). In some implementations, the systems and techniques described in U.S. Provisional Patent Application No. 62/828,186, "HYBRID SURFACE MODELLING WITH SUBDIVISION SURFACES AND NURBS", filed Apr. 2, 2019, can be used.

Figure 3C:
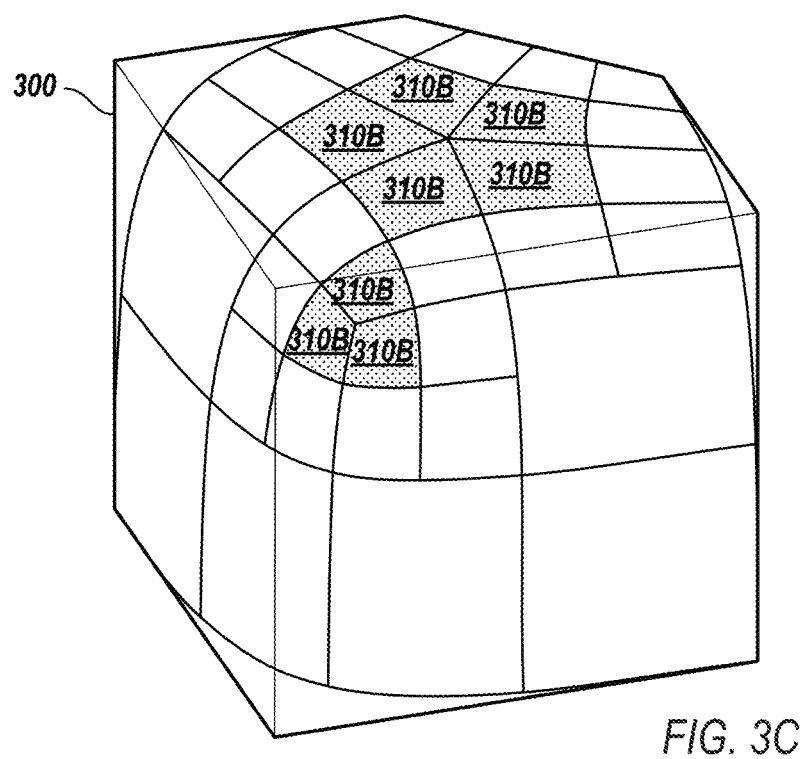
Figure 3D:
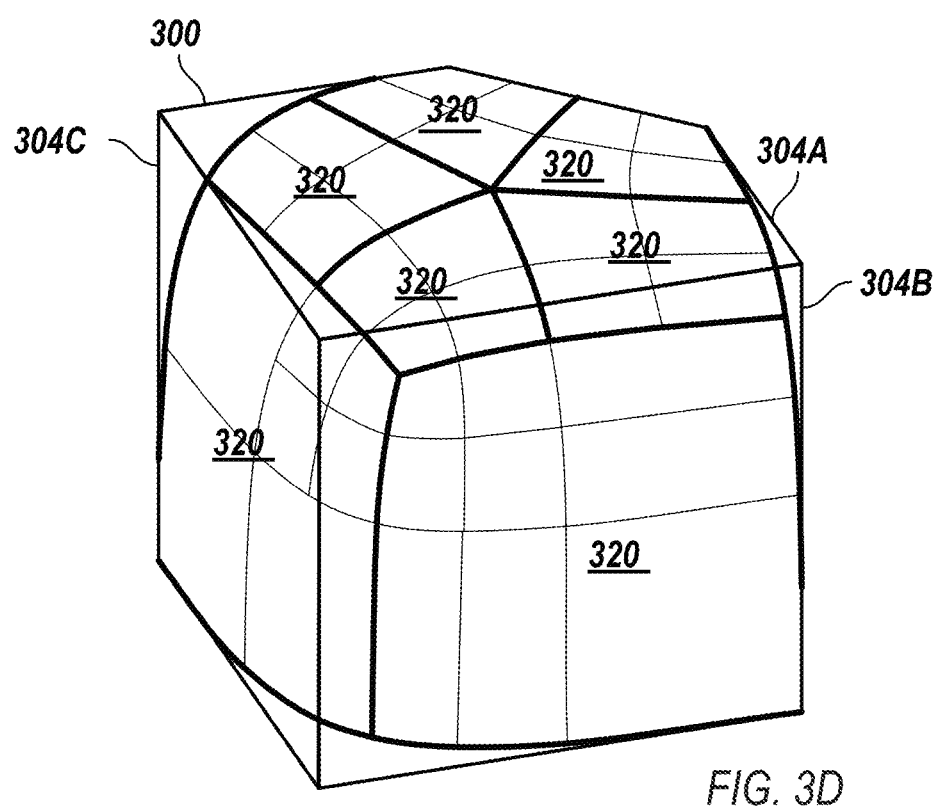

FIGS. 3C and 3D are graphical renderings showing the example of FIGS. 3A and 3B, with the replacement surface patches 310B produced and then combined. The adjacent surface patches 310A are used to compute curvature continuous degree 7 NURBS surfaces 310B independently from each other. Then, these NURBS surfaces 310B are combined with non-discarded surface patches, from the limit surface that belong to the same polygon of the control mesh 300, to form multi-span NURBS surfaces 320. As shown, replacement surface patches can be combined with each other along with non-discarded surface patches, and replacement surface patch(es) can be combined with several non-discarded surface patches. In this example, all the NURBS surfaces produced for each quad control face 304B, 304C of the control mesh 300 have been combined into respective single multi-span NURBS surfaces (one multi-span NURBS surface per control quad), and the NURBS surfaces produced for the N-gon control face 304A have been combined into N multi-span NURBS surfaces. This combining of the various surfaces into larger multi-span NURBS surfaces increases the handiness of the result, as it reduces the number of surfaces to a minimum.

Note that the degrees of the non-discarded surface patches can be increased for combining, or potentially the degrees of the replacement surface patches 310B can be decreased for combining. Depending on the continuity, some control points or rows of control points can be eliminated. Thus, combining the patches helps to get rid of some control points, and it makes the subdivision surface model (e.g., with NURBS surfaces as the limit surface) more useful for further 3D modeling (e.g., user editing and downstream processing).

In this example, the N-gon control face 304A is a 5-gon. A more detailed example of $G^2$ N-gon construction is provided below in connection with FIGS. 5 and 6. Further, as will be appreciated, N-gons other than 5-gons can be used, including different N-gons in the same control mesh, along with quads. In general, the hole filling calculations can be less involved due to the guarantee of having $C^2$ surfaces from the two levels of subdivision (e.g., the adaptive refinement to two levels around extraordinary points). Thus, the transition formulas for creating the $G^2$ continuity in the subdivision surface model end up being less complex because the environment is $C^2$.

Returning to FIG. 4, a check is made 410 for additional star points to be processed, and once all the star points on the limit surface have been processed, the surface patches of the limit surface (including the combined surface patches around each star point) are processed 430 for output by a physical device. The physical device can be a display device, e.g., display device 120, and the processing 430 can include rendering at least a portion of the combined surface patches to the display device, e.g., to allow the user to edit the subdivision surface model, such as by providing input to modify the subdivision surface. In response to an edit 400 of the subdivision surface's control mesh, the limit surface is updated and the process 405-425 repeats.

The physical device can be a permanent storage device, and the processing 430 can include rendering at least a portion of the combined surface patches to an output document stored in the permanent storage device, e.g., for use in manufacturing a physical structure corresponding to the modeled object using the one or more computer-controlled manufacturing systems, e.g., AM machine(s) and/or SM machine(s) 170, and/or other manufacturing machines. The physical device can be a digital projector, and the processing 430 can include rendering at least a portion of the combined surface patches to an animation document, e.g., DCP 165, for the digital projector, e.g., digital projector 174.

Moreover, the physical device can be one or more computer-controlled manufacturing systems including an additive manufacturing machine or a subtractive manufacturing machine, and the processing 430 can include causing manufacturing of at least a portion of the modeled object using the one or more computer-controlled manufacturing systems, e.g., AM machine(s) and/or SM machine(s) 170, and/or other manufacturing machines. For example, the processing 430 can include generating 432, e.g., by CAD program(s) 116, toolpath specifications for the computer-controlled manufacturing system(s) (e.g., AM machine(s) and/or SM machine(s) 170) using the 3D model, and manufacturing 434, e.g., by CAD program(s) 116, at least a portion of the physical structure corresponding to the modeled object with the computer-controlled manufacturing system(s) (e.g., AM machine(s) and/or SM machine(s) 170) using the toolpath specifications generated for the manufacturing machine (e.g., AM machine(s) and/or SM machine(s) 170).

Figure 5:
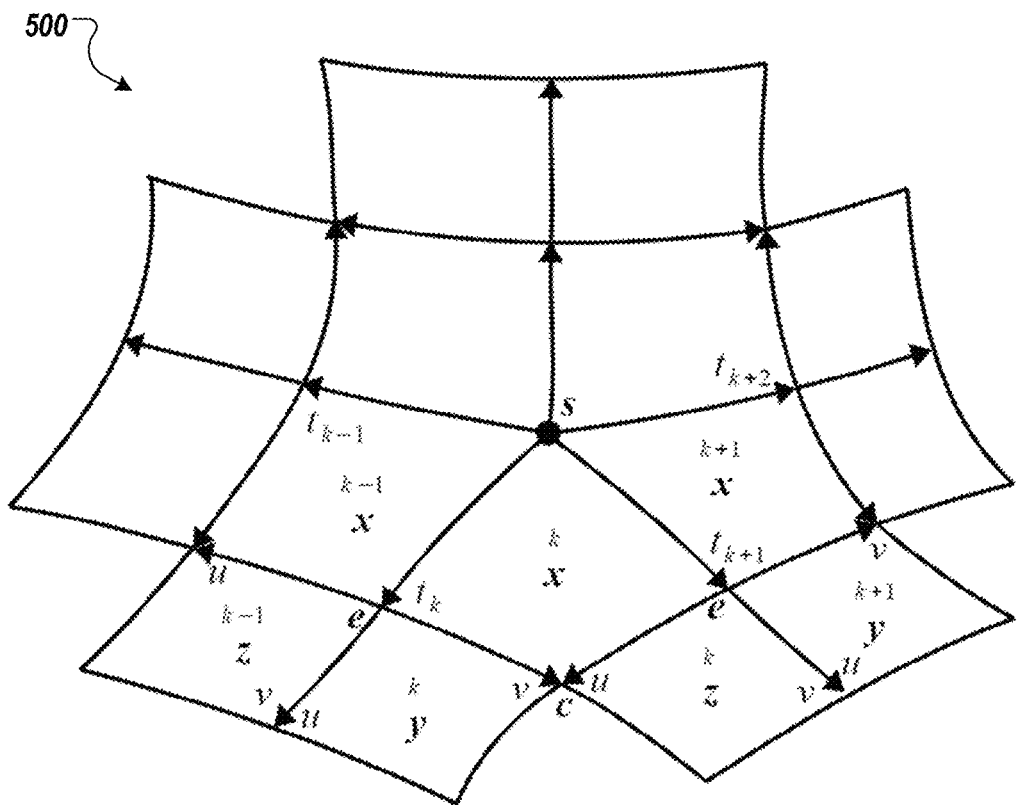
FIGS. 5 and 6 are diagrams showing a 5-gon used as an example of $G^2$ surface construction.
Figure 6:
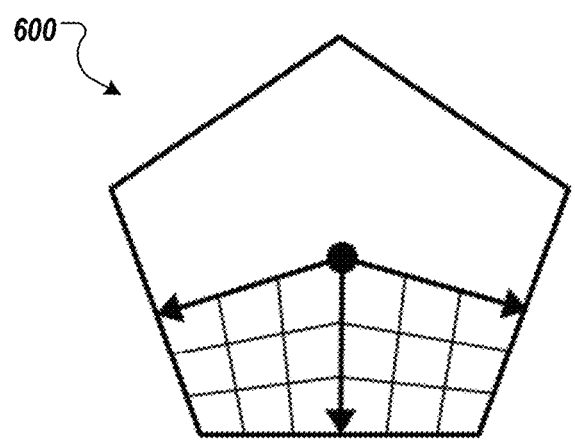

FIGS. 5 and 6 are diagrams showing a 5-gon used as an example of $G^2$ surface construction. FIG. 6 shows a 5-gon 600 to illustrate how the natural relation between the parameters of two neighbored surfaces can be obtained from a regular N-gon. FIG. 5 shows an environment 500 of a 5-gon with it neighboring patches to illustrate $G^2$ surface construction. The inner surfaces to create are $$\overset{k}{x}(t_k, t_{k+1}).$$

They are surrounded by the surfaces $$\overset{k}{y}(u, v) \text{ and } \overset{k}{z}(u, v) \cdot t_k, u, v \in [0, 1] \text{ and } k = 0 \ldots N-1.$$

The outer surfaces are $C^2$ connected, that means they have equal derivatives up to the derivative depth two. Unfortunately $C^2$ is expected to be impossible between the inner surfaces. Between the inner and outer surfaces, $C^2$ is possible but not suitable regarding the degree. Hence, instead of using analytical continuity $C^2$, geometrical continuity $G^2$ is used for inner and outer surface transitions.

The symmetric inner surface transition formulas are:

$$G_s^0: \overset{k-1}{x}(0, t) = \overset{k}{x}(t, 0)$$

$$G_s^1: \overset{k-1}{x}_{k-1}(0, t) + \overset{k}{x}_{k+1}(t, 0) = b(t)\overset{k}{x}_k(t, 0)$$

$$G_s^2: \overset{k-1}{x}_{k-1,k-1}(0, t) - b(t)\overset{k-1}{x}_{k-1,k}(0, t) - c(t)\overset{k-1}{x}_{k-1}(0, t) =$$
$$\overset{k}{x}_{k+1,k+1}(t, 0) - b(t)\overset{k}{x}_{k,k+1}(t, 0) - c(t)\overset{k}{x}_{k+1}(t, 0)$$

with $$\overset{k}{x}_k(t_k, t_{k+1}) = \frac{d}{dt_k}\overset{k}{x}(t_k, t_{k+1})$$

$$\overset{k}{x}_{k+1}(t_k, t_{k+1}) = \frac{d}{dt_{k+1}}\overset{k}{x}(t_k, t_{k+1})$$

The common outer surface transition formulas are:

$$G_e^0: \overset{k-1}{x}(t, 1) = \overset{k-1}{z}(t, 0)$$

$$\overset{k}{x}(1, t) = \overset{k}{y}(0, t)$$

$$G_e^1: \overset{k-1}{x}_k(t, 1) = \bar{u}(t)\overset{k-1}{z}_v(t, 0) + \bar{v}(t)\overset{k-1}{z}_u(t, 0)$$

$$\overset{k}{x}_k(1, t) = \bar{u}(t)\overset{k}{y}_u(0, t) + \bar{v}(t)\overset{k}{y}_v(0, t)$$

$$G_e^2: \overset{k-1}{x}_{k,k}(t, 1) = \bar{u}(t)\overset{k-1}{z}_v(t, 0) + \bar{v}(t)\overset{k-1}{z}_u(t, 0) +$$
$$\bar{u}^2(t)\overset{k-1}{z}_{vv}(t, 0) + 2\bar{u}(t)\bar{v}(t)\overset{k-1}{z}_{uv}(t, 0) + \bar{v}^2(t)\overset{k-1}{z}_{uu}(t, 0)$$

$$\overset{k}{x}_{k,k}(1, t) = \bar{u}(t)\overset{k}{y}_u(0, t) + \bar{v}(t)\overset{k}{y}_v(0, t) + \bar{u}^2(t)\overset{k}{y}_{uu}(0, t) +$$
$$2\bar{u}(t)\bar{v}(t)\overset{k}{y}_{uv}(0, t) + \bar{v}^2(t)\overset{k}{y}_{vv}(0, t)$$

with $$y_u(u, v) = \frac{d}{du}y(u, v)$$

$$y_v(u, v) = \frac{d}{dv}y(u, v)$$

$$z_u(u, v) = \frac{d}{du}z(u, v)$$

$$z_v(u, v) = \frac{d}{dv}z(u, v)$$

The transition functions b(t), c(t), $\bar{u}(t)$, $\bar{v}(t)$, $\bar{\bar{u}}(t)$ and $\bar{\bar{v}}(t)$ should be as simple as possible. They cause the necessary degree elevation of the inner surfaces compared with the outer ones.

If one consider the $G_s^r$ formulas and their derivatives at the star point s, one gets cyclic dependencies up to the fourth surface derivatives. As a first result, one finds that $$b(0) = 2\cos\frac{2\pi}{N} = \beta.$$

On the other hand b(1)=0. So one can arrange b(t) as a linear function b(t)=β(1−t). This choice complies with the natural relation $b_n(t)$. For c(t) the natural relation is $$c_n(t) = \frac{\beta^2(1-t)}{2 + \beta(1-t)}.$$

But this relation is unhandy, because it is rational. Hence one can use the easier function c(t)=γ(1−t) with $$\gamma = \frac{\beta^2}{2 + \beta}$$

fulfilling at least $c(t)=c_n(t)$ or $t \in \{0,1\}$.

The natural relation between the parameters of two neighbored surfaces can be obtained from a regular N-gon. See FIG. 6. The transformation of the parameters of one surface into the parameters of the other is not linear.

The $G_s^r$ formulas and their derivatives at the edge points e and the corner points c lead to relations between the transition functions $\bar{u}(t)$, $\bar{v}(t)$, $\bar{\bar{u}}(t)$, $\bar{\bar{v}}(t)$, and their derivatives:

$\bar{u}(1)=1$ $\bar{v}(0)=\bar{v}(1)=0$ $\bar{v}'(1)=\bar{u}'(1)$ $\bar{v}''(1)=\bar{u}''(1)$ $\bar{\bar{u}}(1)=0$ $\bar{\bar{v}}(0)=\bar{\bar{v}}(1)=0$ $\bar{\bar{v}}'(1)=\bar{\bar{u}}'(1)$ $\bar{\bar{v}}''(1)=\bar{\bar{u}}''(1)$ $\bar{u}'(0)=-\frac{1}{2}\beta\bar{u}(0)$ $\bar{v}'(0)=-\beta\bar{v}(0)-\gamma$ $\bar{\bar{v}}'(0)=-\beta\bar{\bar{u}}(0)$ $\bar{\bar{v}}''(0)=-2\beta\bar{\bar{v}}'(0)-2\gamma\bar{v}'(0)$ Given these relations, there are several ways to define the transition function. Aiming for low degrees, a quadratic function can be used for $\bar{u}(t)$, a cubic function can be used for $\bar{v}(t)$ and $\bar{\bar{u}}(t)$, and a quartic function can be used for $\bar{\bar{v}}(t)$. This approach provides the freedom to choose in addition $\bar{u}(0)=0$ and $\bar{\bar{u}}(0)>0$ to completely define the transition functions. Using those transition functions leads to a degree elevation by only four; compare $G_e^2$ where their impact is clear. Four is expected to be the smallest possible degree elevation.

The $G_s^r$ formulas now deliver the positions, and the first and second derivatives of all $$\overset{k}{x}$$

along the boundary of the N-gon. Especially, the position is achieved, and the first and second derivative at the end of each inner seam curve $$\overset{k}{x}(t, 0)$$

running from s to e. With that information, the star point s can determined. Therefore, in some implementations, the seam curves are assumed to be cubic Bézier curves. Then the last three of four Bézier points are already given. So a natural choice for the common first Bézier point, the star point s, is the arithmetic mean of the second Bézier points of all seam curves.

In the next step, all first derivatives $$\overset{k}{x}_k$$

at s are determined. These are the tangent directions which have to build a plain star. This provides a common tangent plane of all surfaces $$\overset{k}{x}$$

there. Therefore, the first derivatives of the cubic Bézier curves can be used. Using $G_s^1$, such a star can be determined based on each two first derivatives of neighbored seam curves. Finally, the arithmetic mean of all those stars delivers a symmetric solution for all first seam curve derivatives at the star point. Adding these tangential conditions to the seam curves, leads to quartic Bézier curves.

Further, the second derivatives $$\overset{k}{x}_{k,k}$$

of the seam curves at s can be determined as follows. $G_s^2$ and $\dot{G}_s^1$ are needed. Starting with the second derivatives of the quartic Bézier curves, the arithmetic mean of all these second derivatives can be considered as a constant portion, which have all second derivatives in common. The rest determines the individual portion each second derivative has. The individual portions have to fulfill a certain cyclic relation. Similar to before, all individual portions can be determined based on each two individual portions of neighbored seam curves. And the arithmetic mean of all those solutions delivers a symmetric solution for all individual portions of second seam curve derivatives at the star point. Adding these curvature conditions to the seam curves, gives the final quintic curves. Further, the mixed second derivatives $$\overset{k}{x}_{k,k+1}$$

from $$\overset{k}{x}_{k,k}$$

can be received via $G_s^2$.

Next, the mixed third derivatives $$\overset{k}{x}_{k,k,k+1} \text{ and } \overset{k}{x}_{k,k+1,k+1}$$

are determined at s. Therefore, $\dot{G}_s^3$ together with $\ddot{G}_s^1$ delivers two cyclic equation systems, which are regular except for N=3 and N=6. The solution for the regular cases can be used for the exceptional cases, too. The mixed fourth derivatives $$\overset{k}{x}_{k,k,k,k+1} \text{ and } \overset{k}{x}_{k,k+1,k+1,k+1}$$

at s have to fulfill $\ddot{G}_s^1$. And $\ddot{G}_2^2$ delivers a cyclic equation system for $$\overset{k}{x}_{k,k,k+1,k+1}$$

with the constraint $$\sum_{k=0}^{N-1} \overset{k}{x}_{k,k,k,k+1} = \sum_{k=0}^{N-1} \overset{k}{x}_{k,k+1,k+1,k+1}.$$

To determine $$\overset{k}{x}_{k,k,k,k+1} \text{ and } \overset{k}{x}_{k,k+1,k+1,k+1},$$

some initial values are needed for them. Since $$\overset{k}{x}_{k+1}, \overset{k}{x}_{k,k+1}, \overset{k}{x}_{k,k,k+1}$$

are already known at s and e, $$\overset{k}{x}_{k+1}(t, 0)$$

can be assumed as quintic Bézier vector curve. Then, an initial vector $$\overset{k}{x}_{k,k,k,k+1}$$

can be received at s. For $$\overset{k}{x}_{k,k+1,k+1,k+1}$$

at s, it is similar. First, these initial mixed fourth derivatives have to be modified to fulfill $\ddot{G}_s^1$. This is done by subtracting half of the initial flaw from both involved derivatives. Second, the flaw with respect to the sums is evaluated and divided in equal portions used to repair the derivatives, whereby $\ddot{G}_s^1$ is preserved.

Finally, all $$\overset{k}{x}_{k,k+1,k+1}$$

can be determined. Via $\ddot{G}_s^2$, all these derivatives can be calculated from only one. The aim is to minimize these mixed derivatives, so one can be set to zero and a solution can be gained for all. And again the arithmetic sum of all those solutions delivers a symmetric solution for all these mixed fourth derivatives. Thus, the seam curves and the mixed second, third and fourth surface derivatives $$\overset{k}{x}_{k,k+1}, \overset{k}{x}_{k,k,k+1}, \overset{k}{x}_{k,k+1,k+1}, \overset{k}{x}_{k,k,k,k+1}, \overset{k}{x}_{k,k,k+1,k+1}, \text{ and } \overset{k}{x}_{k,k+1,k+1,k+1}$$

have been determined at the star point s.

In $G_s^2$ the degree of $$c(t)\overset{k-1}{x}_{k-1}(0, t)$$

is one bigger than the surface degree, because c(t) is a linear function. To solve this discrepancy, that equation can be transformed into:

$$G_s^2: \overset{k}{x}_{k+1,k+1}(t, 0) - \overset{k-1}{x}_{k-1,k-1}(0, t) = \\ b(t)\left(\overset{k}{x}_{k+1}(t, 0) - \overset{k-1}{x}_{k-1,k}(0, t)\right) + c(t)\left(\overset{k}{x}_{k+1}(t, 0) - \overset{k-1}{x}_{k-1}(0, t)\right)$$

This requires that the difference $$\overset{k}{v}(t) = \overset{k}{x}_{k+1}(t, 0) - \overset{k-1}{x}_{k-1}(0, t)$$

has to be one degree less than the surface degree. Already known are $$\overset{k}{v}, \overset{k}{v}_k, \overset{k}{v}_{k,k}, \text{ and } \overset{k}{v}_{k,k,k} \text{ at } s, \text{ and } \overset{k}{v}, \overset{k}{v}_k, \overset{k}{v}_{k,k}$$

at e. Hence, all $$\overset{k}{v}(t)$$

have to have at least degree six. This implies that the surfaces $$\overset{k}{x}$$

have to have at least degree seven. With given $$\overset{k}{v}_{k,k,k},$$

the fifth mixed surface derivatives $$\overset{k}{x}_{k,k,k,k,k+1} \text{ and } \overset{k}{x}_{k,k+1,k+1,k+1,k+1}$$

are also obtained, via $\overset{...}{G}_s^{\,1}$, at s.

All further remaining surface derivatives related to $G_s^{\,r}$ can be calculated using an initial value as described before, and subtracting half of the initial flaw with respect to the derivative of $G_s^{\,r}$ from it. But the surfaces $$\overset{k}{x}$$

are not yet completely defined. Thus far, the border and the first and second surface derivatives across the border have been determined to support $G^2$. Since degree seven and Bézier representation is used in this example, four inner Bézier points still have to determined. That can be done in several ways. They can be calculated based on one, two, or even all three surrounding Bézier point rings. One established method is the algebraic sum, also known as Gordon-Coons-Patch. But note that, to guarantee a harmonic distribution of the missing Bézier points, it is sufficient to calculate them from only two surrounding Bézier point rings.

Figure 7:
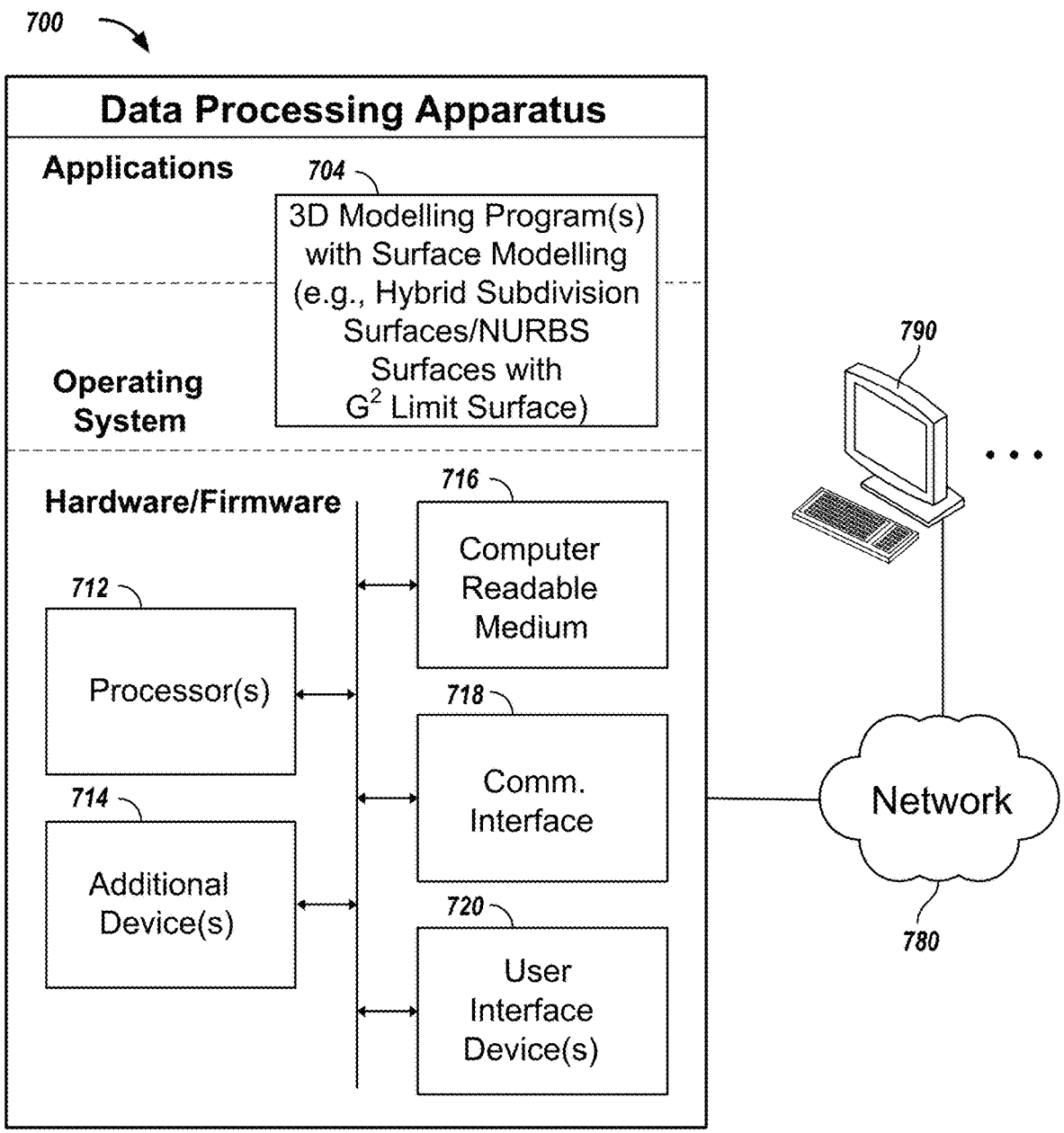
FIG. 7 is a schematic diagram of a data processing system including a data processing apparatus, which can be programmed as a client or as a server.

FIG. 7 is a schematic diagram of a data processing system including a data processing apparatus 700, which can be programmed as a client or as a server. The data processing apparatus 700 is connected with one or more computers 790 through a network 780. While only one computer is shown in FIG. 7 as the data processing apparatus 700, multiple computers can be used. The data processing apparatus 700 includes various software modules, which can be distributed between an applications layer and an operating system. These can include executable and/or interpretable software programs or libraries, including tools and services of one or more 3D modeling programs 704 that implement the systems and techniques described herein. Thus, the 3D modeling program(s) 704 can be CAD program(s) 704 that implement 3D modeling functions and production of continuous ($G^2$) NURBS surfaces from arbitrary subdivision surface meshes, and potentially also hybrid surface modelling with subdivision surfaces and NURBS surfaces.

Further, the program(s) 704 can implement physical simulation operations (finite element analysis (FEA) or other), generative design operations (e.g., using level-set based method(s) for generative design), manufacturing control operations (e.g., generating and/or applying toolpath specifications to effect manufacturing of designed objects), and/or movie animation production. The number of software modules used can vary from one implementation to another. Moreover, the software modules can be distributed on one or more data processing apparatus connected by one or more computer networks or other suitable communication networks.

The data processing apparatus 700 also includes hardware or firmware devices including one or more processors 712, one or more additional devices 714, a computer readable medium 716, a communication interface 718, and one or more user interface devices 720. Each processor 712 is capable of processing instructions for execution within the data processing apparatus 700. In some implementations, the processor 712 is a single or multi-threaded processor. Each processor 712 is capable of processing instructions stored on the computer readable medium 716 or on a storage device such as one of the additional devices 714. The data processing apparatus 700 uses the communication interface 718 to communicate with one or more computers 790, for example, over the network 780. Examples of user interface devices 720 include a display, a camera, a speaker, a microphone, a tactile feedback device, a keyboard, a mouse, and VR and/or AR equipment. The data processing apparatus 700 can store instructions that implement operations associated with the program(s) described above, for example, on the computer readable medium 716 or one or more additional devices 714, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
obtaining, by a computer aided design program, a control mesh of a subdivision surface;
obtaining, by the computer aided design program, multiple surface patches from the control mesh using a subdivision surface method, wherein the multiple surface patches represent a limit surface of the subdivision surface, and using the subdivision surface method comprises subdividing the control mesh at least twice in at least one extraordinary region of the control mesh, the extraordinary region comprising an extraordinary point or an N-gon in the control mesh;
discarding, by the computer aided design program, discontinuous surface patches from the multiple surface patches, the discontinuous surface patches comprising surface patches that include at least one star point;
producing, by the computer aided design program, replacement surface patches for the discontinuous surface patches using adjacent surface patches from the multiple surface patches, wherein the replacement surface patches are curvature continuous with each other and with the adjacent surface patches;
combining, by the computer aided design program, each of the replacement surface patches with at least one non-discarded surface patch of the multiple surface patches that is generated from a same polygon of the control mesh as the replacement surface patch; and processing, by the computer aided design program, the combined surface patches for output by a physical device.

2. The method of claim 1, wherein the subdivision surface method comprises an adaptive subdivision surface program, and obtaining the multiple patches comprises calling the adaptive subdivision surface program with an upper limit of two subdivisions.

3. The method of claim 2, wherein each of the replacement surface patches is a bi-septic (degree seven) NURBS surface.

4. The method of claim 3, wherein the multiple surface patches produced by the adaptive subdivision surface program comprise bi-cubic Bézier patches.

5. The method of claim 2, wherein the combining comprises forming multi-span NURBS surfaces from the replacement surface patches and non-discarded surface patches of the multiple surface patches.

6. The method of claim 2, wherein the physical device comprises a display device, and processing the combined surface patches for output comprises rendering at least a portion of the combined surface patches to the display device.

7. The method of claim 2, wherein the physical device comprises a permanent storage device, and processing the combined surface patches for output comprises rendering at least a portion of the combined surface patches to an output document stored in the permanent storage device.

8. The method of claim 2, wherein the physical device comprises a digital projector, and processing the combined surface patches for output comprises rendering at least a portion of the combined surface patches to an animation document for the digital projector.

9. The method of claim 2, wherein the physical device comprises one or more computer-controlled manufacturing systems comprising an additive manufacturing machine or a subtractive manufacturing machine, and processing the combined surface patches for output comprises:

generating toolpath specifications for the additive manufacturing machine or the subtractive manufacturing machine using at least a portion of the combined surface patches; and manufacturing at least a portion of a physical structure corresponding to the subdivision surface with the additive manufacturing machine or the subtractive manufacturing machine using the toolpath specifications generated for the additive manufacturing machine or the subtractive manufacturing machine.

10. A system comprising:

a non-transitory storage medium having instructions of a computer aided design program stored thereon; and one or more data processing apparatus able to run the instructions of the computer aided design program to perform operations specified by the instructions of the computer aided design program to cause the one or more data processing apparatus to:

obtain a control mesh of a subdivision surface;

obtain multiple surface patches from the control mesh using a subdivision surface method, wherein the multiple surface patches represent a limit surface of the subdivision surface, and using the subdivision surface method comprises subdividing the control mesh at least twice in at least one extraordinary region of the control mesh, the extraordinary region comprising an extraordinary point or an N-gon in the control mesh;

discard discontinuous surface patches from the multiple surface patches, the discontinuous surface patches comprising surface patches that include at least one star point;

produce replacement surface patches for the discontinuous surface patches using adjacent surface patches from the multiple surface patches, wherein the replacement surface patches are curvature continuous with each other and with the adjacent surface patches;

combine each of the replacement surface patches with at least one non-discarded surface patch of the multiple surface patches that is generated from a same polygon of the control mesh as the replacement surface patch; and process the combined surface patches for output by a physical device.

11. The system of claim 10, wherein the subdivision surface method comprises an adaptive subdivision surface program, and the instructions of the computer aided design program to cause the one or more data processing apparatus to obtain the multiple patches comprise instruction to cause the one or more data processing apparatus to call the adaptive subdivision surface program with an upper limit of two subdivisions.

12. The system of claim 11, wherein each of the replacement surface patches is a bi-septic (degree seven) NURBS surface.

13. The system of claim 11, wherein the instructions of the computer aided design program to cause the one or more data processing apparatus to combine comprise instruction to cause the one or more data processing apparatus to form multi-span NURBS surfaces from the replacement surface patches and non-discarded surface patches of the multiple surface patches.

14. The system of claim 11, wherein the physical device comprises a display device, and the instructions of the computer aided design program to cause the one or more data processing apparatus to process the combined surface patches for output comprise instruction to cause the one or more data processing apparatus to render at least a portion of the combined surface patches to the display device.

15. The system of claim 10, comprising one or more computer-controlled manufacturing systems comprising an additive manufacturing machine or a subtractive manufacturing machine, wherein the one or more data processing apparatus are able to run the instructions of the computer aided design program to generate toolpath specifications for the additive manufacturing machine or the subtractive manufacturing machine from at least a portion of the combined surface patches, and to manufacture at least a portion of a physical structure corresponding to the subdivision surface with the additive manufacturing machine or the subtractive manufacturing machine using the toolpath specifications generated for the additive manufacturing machine or the subtractive manufacturing machine.

16. A non-transitory computer-readable medium encoding instructions operable to cause data processing apparatus to perform operations comprising:

obtaining a control mesh of a subdivision surface;

obtaining multiple surface patches from the control mesh using a subdivision surface method, wherein the multiple surface patches represent a limit surface of the subdivision surface, and using the subdivision surface method comprises subdividing the control mesh at least twice in at least one extraordinary region of the control mesh, the extraordinary region comprising an extraordinary point or an N-gon in the control mesh;

discarding discontinuous surface patches from the multiple surface patches, the discontinuous surface patches comprising surface patches that include at least one star point;

producing replacement surface patches for the discontinuous surface patches using adjacent surface patches from the multiple surface patches, wherein the replacement surface patches are curvature continuous with each other and with the adjacent surface patches;

combining each of the replacement surface patches with at least one non-discarded surface patch of the multiple surface patches that is generated from a same polygon of the control mesh as the replacement surface patch; and processing the combined surface patches for output by a physical device.

17. The non-transitory computer-readable medium of claim 13, wherein the subdivision surface method comprises an adaptive subdivision surface program, and obtaining the multiple patches comprises calling the adaptive subdivision surface program with an upper limit of two subdivisions.

18. The non-transitory computer-readable medium of claim 17, wherein each of the replacement surface patches is a bi-septic (degree seven) NURBS surface.

19. The non-transitory computer-readable medium of claim 17, wherein the combining comprises forming multi-span NURBS surfaces from the replacement surface patches and non-discarded surface patches of the multiple surface patches.

20. The non-transitory computer-readable medium of claim 17, wherein the physical device comprises a display device, and processing the combined surface patches for output comprises rendering at least a portion of the combined surface patches to the display device.

* * * * *

UNITED STATES PATENT AND TRADEMARK OFFICE
CERTIFICATE OF CORRECTION

PATENT NO. : 11,120,625 B2
APPLICATION NO. : 16/837690
DATED : September 14, 2021
INVENTOR(S) : Pfortner et al.

Page 1 of 1

It is certified that error appears in the above-identified patent and that said Letters Patent is hereby corrected as shown below:

In the Claims

Column 22, Line 2, in Claim 17: delete "claim 13," and insert --claim 16,--, therefor.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*